United States Patent
Ryu et al.

(10) Patent No.: US 9,831,491 B2
(45) Date of Patent: Nov. 28, 2017

(54) SI/C COMPOSITE, METHOD OF PREPARING THE SAME, AND ANODE ACTIVE MATERIAL FOR LITHIUM SECONDARY BATTERY INCLUDING THE SI/C COMPOSITE

(71) Applicant: LG Chem, Ltd., Seoul (KR)

(72) Inventors: Ji Hoon Ryu, Daejeon (KR); Hong Kyu Park, Daejeon (KR); Wang Mo Jung, Daejeon (KR); Sung Joong Kang, Daejeon (KR); Chi Ho Jo, Daejeon (KR); Gi Beom Han, Daejeon (KR)

(73) Assignee: LG Chem, Ltd. (KR)

( * ) Notice: Subject to any disclaimer, the term of this patent is extended or adjusted under 35 U.S.C. 154(b) by 675 days.

(21) Appl. No.: 14/272,636

(22) Filed: May 8, 2014

(65) Prior Publication Data

US 2014/0242455 A1 Aug. 28, 2014

Related U.S. Application Data

(63) Continuation of application No. PCT/KR2014/000500, filed on Jan. 17, 2014.

(30) Foreign Application Priority Data

Feb. 19, 2013 (KR) ........................ 10-2013-0017319

(51) Int. Cl.
*H01M 4/1395* (2010.01)
*H01M 4/36* (2006.01)
(Continued)

(52) U.S. Cl.
CPC ......... *H01M 4/364* (2013.01); *H01M 4/0404* (2013.01); *H01M 4/134* (2013.01);
(Continued)

(58) Field of Classification Search
CPC ....... H01M 4/134; H01M 4/1395; B32B 9/00; B32B 19/00
(Continued)

(56) References Cited

U.S. PATENT DOCUMENTS

2005/0214644 A1 9/2005 Aramata et al.
2006/0178496 A1\* 8/2006 Lin ..................... C01B 33/1585
528/39
(Continued)

FOREIGN PATENT DOCUMENTS

CN 102219227 A 10/2011
JP 2009-032693 A 2/2009
(Continued)

OTHER PUBLICATIONS

International Search Report for PCT/KR2014/000500, dated Apr. 30, 2014.
(Continued)

*Primary Examiner* — James Lee
(74) *Attorney, Agent, or Firm* — Lerner, David, Littenberg, Krumholz & Mentlik, LLP

(57) ABSTRACT

Provided are a Si/C composite, in which carbon (C) is dispersed in an atomic state in a silicon (Si) particle, and a method of preparing the Si/C composite.

Since the Si/C composite of the present invention is used as an anode active material, electrical conductivity may be further improved and volume expansion may be minimized. Thus, life characteristics of a lithium secondary battery may be improved.

14 Claims, 4 Drawing Sheets

(51) Int. Cl.
*H01M 4/04* (2006.01)
*H01M 4/134* (2010.01)
*H01M 4/38* (2006.01)
*H01M 4/587* (2010.01)

(52) U.S. Cl.
CPC ......... *H01M 4/1395* (2013.01); *H01M 4/386* (2013.01); *H01M 4/587* (2013.01)

(58) Field of Classification Search
USPC .................................................. 429/121–347
See application file for complete search history.

(56) References Cited

U.S. PATENT DOCUMENTS

| | | |
|---|---|---|
| 2009/0029256 A1 | 1/2009 | Mah et al. |
| 2011/0104553 A1 | 5/2011 | Pol et al. |
| 2012/0032109 A1 | 2/2012 | Konig et al. |
| 2012/0107693 A1 | 5/2012 | Ishida et al. |
| 2012/0244428 A1 | 9/2012 | Park et al. |
| 2012/0328943 A1 | 12/2012 | Mah et al. |
| 2013/0112605 A1 | 5/2013 | Wyndham et al. |
| 2013/0206665 A1 | 8/2013 | Wyndham et al. |

FOREIGN PATENT DOCUMENTS

| | | |
|---|---|---|
| JP | 2010-501970 A | 1/2010 |
| JP | 2012-523069 A | 9/2012 |
| JP | 2013-539016 A | 10/2013 |
| KR | 2009-0011888 A | 2/2009 |
| KR | 2009-0066031 A | 6/2009 |
| KR | 2012-0044043 A | 5/2012 |
| KR | 2012-0109080 A | 10/2012 |
| WO | 2008/025188 A1 | 3/2008 |

OTHER PUBLICATIONS

Search Report from European application No. 14733952.7 dated Jan. 16, 2015.

Kong, Jing et al., "Synthesis of Individual single-walled carbon nanotubes on patterned silicon wafers." Nature, vol. 395, Oct. 29, 1998, pp. 878-881.

Singh, Rachana et al., "Synthesis and evaluation of thermal, photophysical and magnetic properties of novel starlike fullerene-organosilane macromolecules." Journal of Organometallic Chemistry, vol. 693, Mar. 18, 2008, pp. 2021-2032.

* cited by examiner

[FIG. 1]
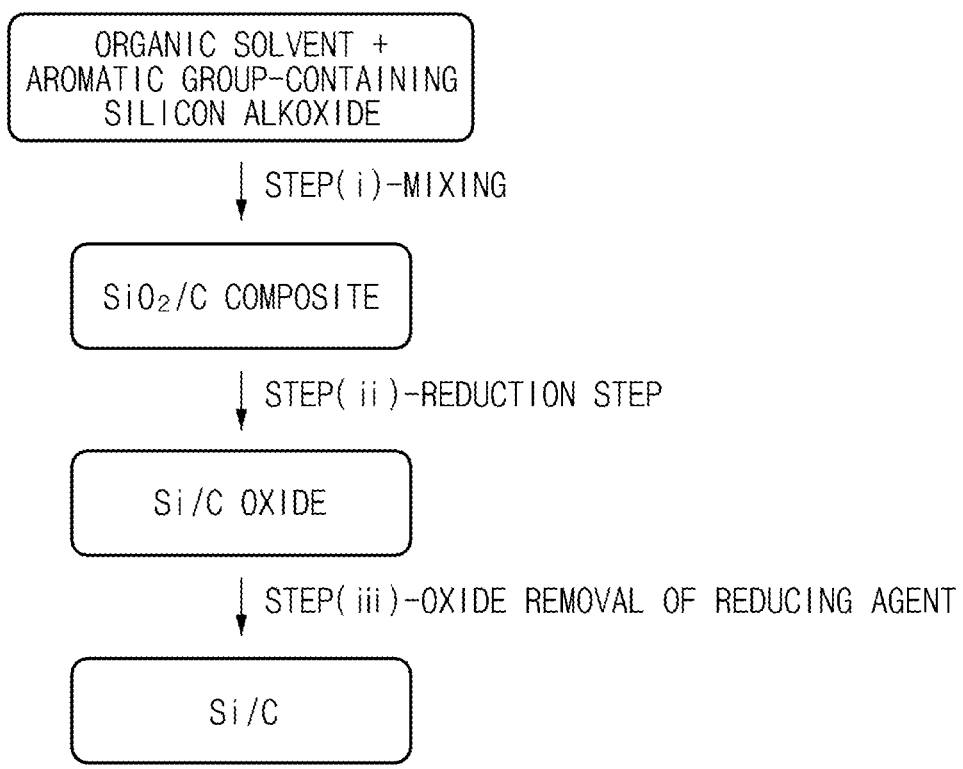

[FIG. 2]
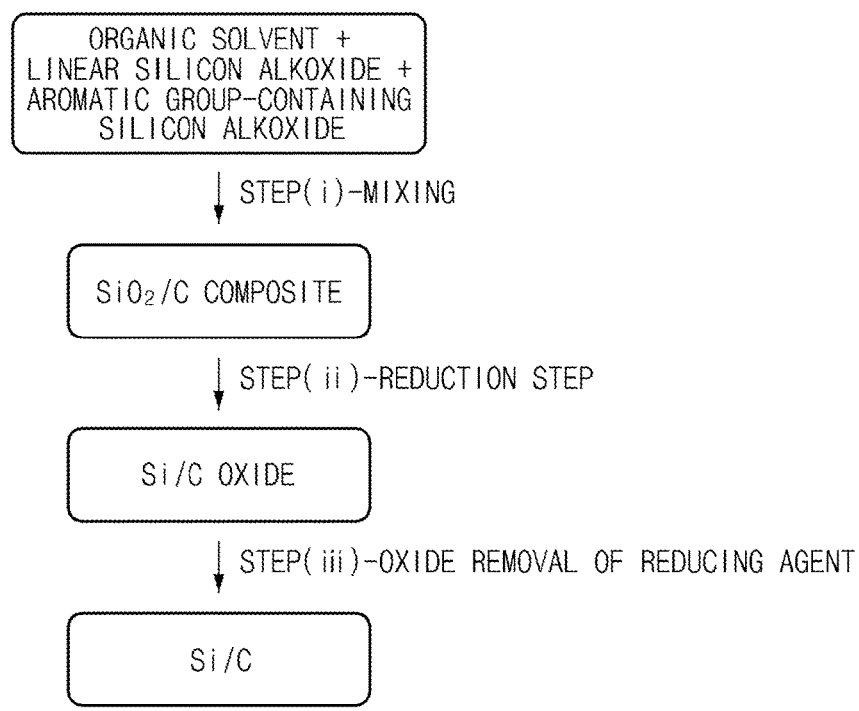
[FIG. 3]
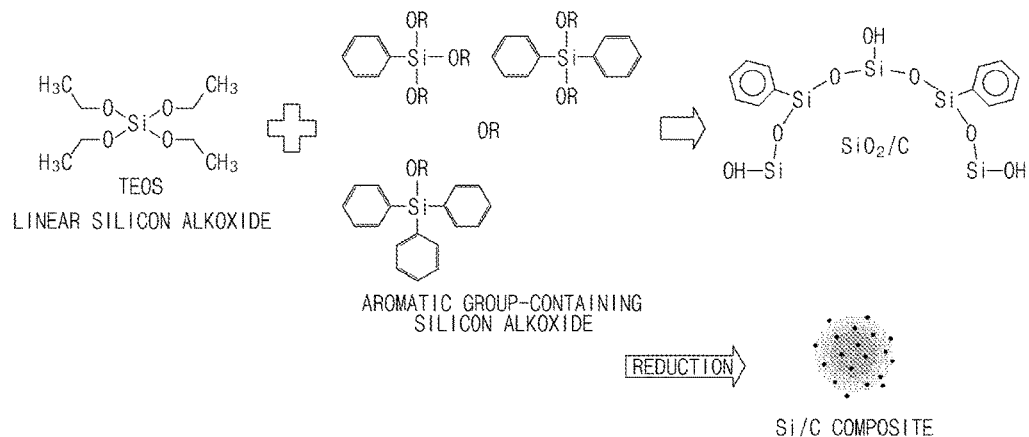

[FIG. 4]

| SAMPLE | PREPARATION EXAMPLE 1 | PREPARATION EXAMPLE 2 | PREPARATION EXAMPLE 3 | PREPARATION EXAMPLE 4 | PREPARATION EXAMPLE 5 | PREPARATION EXAMPLE 6 | PREPARATION EXAMPLE 7 |
|---|---|---|---|---|---|---|---|
| SEM × 50k | | | | | | | |
| SEM × 20k | | | | | | | |
| PARTICLE DIAMETER | 350nm | 350nm | 350nm | 400nm | 200–1000nm | 200–1000nm | 2–10μm |
| CARBON (wt%) | 2.72 | 5.40 | 8.09 | 10.17 | 28.18 | 45.27 | 56.83 |

[FIG. 5]

| C/Si ratio | EXAMPLE 3 |
|---|---|
| SEM | |
| PARTICLE DIAMETER (μm) | 0.4 |
| CARBON (wt%) | 7.22 |

[FIG. 6]
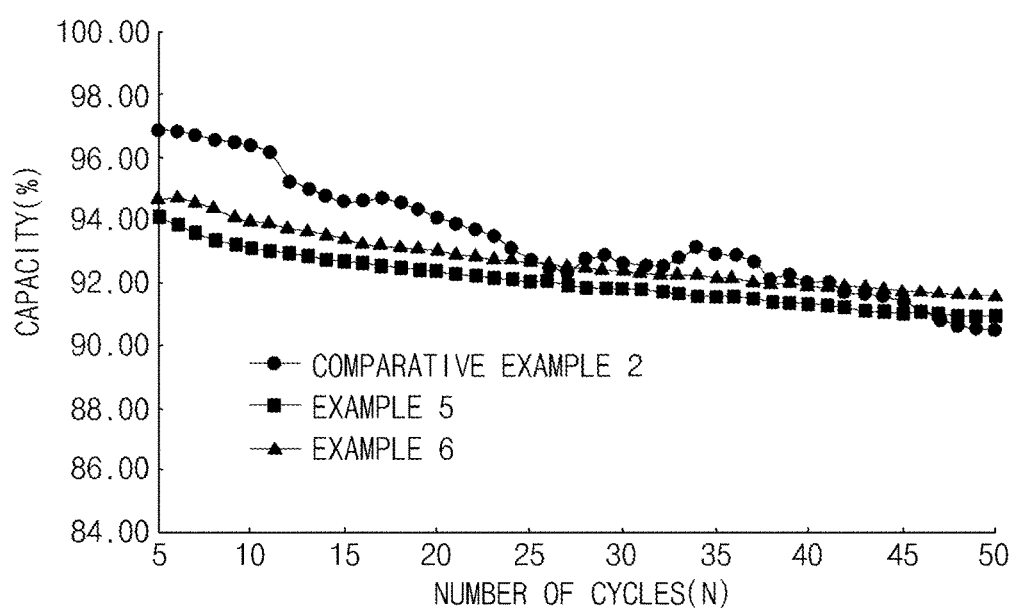

SI/C COMPOSITE, METHOD OF PREPARING THE SAME, AND ANODE ACTIVE MATERIAL FOR LITHIUM SECONDARY BATTERY INCLUDING THE SI/C COMPOSITE

CROSS-REFERENCE TO RELATED APPLICATIONS

The present application is a continuation of International Application No. PCT/KR2014/000500 filed on Jan. 17, 2014, which claims the benefit of Korean Patent Application No. 102013-0017319, filed on Feb. 19, 2013, the disclosures of which are incorporated herein by reference.

TECHNICAL FIELD

The present invention relates to a silicon (Si)/carbon (C) composite, a method of preparing the same, and an anode active material for a lithium secondary battery including the Si/C composite.

BACKGROUND ART

Lithium secondary batteries, which are recently in the spotlight as a power source of portable and small electronic devices, are batteries exhibiting high energy density, in which high discharge voltages that are two times or more than those of typical batteries using an alkaline aqueous solution may be exhibited by using an organic electrolyte solution.

Graphite is mainly used as an anode material of a lithium secondary battery. However, graphite has a low capacity per unit mass of 372 mAh/g and a high-capacity lithium secondary battery may be difficult to be prepared by using graphite.

As an anode material exhibiting higher capacity than graphite, a material forming an intermetallic compound with lithium, such as silicon, tin, and oxides thereof, may be promising. However, volumes of the above materials may expand because crystal structures thereof may be changed when absorbing and storing lithium. When silicon absorbs and stores the maximum amount of lithium, the silicon may be transformed into $Li_{4.4}Si$ and the volume of $Li_{4.4}Si$ may expand due to charging. With respect to the rate of increase in volume due to the charging, the volume may expand up to about 4.12 times the volume of the silicon before the volume expansion.

Also, research into achieving a buffering effect on the volume change by using nanoscale silicon particles or using porous silicon has been conducted. With respect to the nanoparticles, a method of coating metal nanoparticles with carbon has been studied.

However, manufacturing costs of nanoparticles may be high, cracks may occur in carbon simultaneously with the expansion of metal during charging due to the brittleness of carbon, and a space may be generated between the carbon and the metal in the process of being shrunk again during discharging. Thus, an effect of improving lifetime may be insignificant.

Also, research into decreasing a volume expansion coefficient by alloying silicon has been conducted as research for increasing the capacity of an anode material such as silicon. However, since a metal, such as silicon (Si), tin (Sn), and aluminum (Al), may be alloyed with lithium during charge and discharge, volume expansion and contraction may occur. Thus, cycle characteristics of the battery may degrade.

DISCLOSURE OF THE INVENTION

Technical Problem

An aspect of the present invention provides a Si/C composite for an anode active material which may improve life characteristics of a lithium secondary battery by improving electrical conductivity and minimizing volume expansion.

Another aspect of the present invention provides a method of preparing the Si/C composite.

Another aspect of the present invention provides an anode active material and an anode which include the Si/C composite.

Another aspect of the present invention provides a lithium secondary battery including the anode.

Technical Solution

According to an aspect of the present invention, there is provided a Si/C composite in which carbon (C) is dispersed in an atomic state in a silicon (Si) particle.

According to another aspect of the present invention, there is provided a method of preparing a Si/C composite including:

i) mixing an aromatic group-containing silicon alkoxide compound expressed by Chemical Formula 1 with an organic solvent to form a $SiO_2/C$ composite;

ii) mixing the $SiO_2/C$ composite obtained in step i) with an alkali metal or an alkaline earth metal and heat treating the mixture in an inert atmosphere to reduce $SiO_2$; and iii) acid treating the heat-treated product obtained in step ii) to remove an oxide, $$SiR^1_n R^2_{4-n} \qquad \text{<Chemical Formula 1>}$$

where, $R^1$ is a phenyl group, $R^2$ is an alkoxy group of $C_1$ to $C_4$, and n is 1 to 3.

According to an aspect of the present invention, there is provided a Si/C composite prepared according to the above preparation method.

According to an aspect of the present invention, there is provided an anode active material including the Si/C composite, an anode, and a lithium secondary battery.

Advantageous Effects

The present invention may economically prepare a Si/C composite in which carbon is dispersed in an atomic state in a silicon particle, and since the Si/C composite thus prepared is used as an anode active material, electrical conductivity may be further improved and volume expansion may be minimized. Thus, life characteristics of a lithium secondary battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and there- FIG. 1 is a flowchart illustrating a method of preparing a Si/C composite using an aromatic group-containing silicon alkoxide compound according to an embodiment of the present invention;

FIG. 2 is a flowchart illustrating a method of preparing a Si/C composite using an aromatic group-containing silicon alkoxide compound and a linear silicon alkoxide compound together according to an embodiment of the present invention;

FIG. 3 is a schematic view illustrating a Si/C composite and a reaction mechanism of a Si/C composite according to an embodiment of the present invention;

FIG. 4 illustrates scanning electron microscope (SEM) images of Preparation Examples 1 to 7 of the present invention before reduction, particle diameters of $SiO_2/C$ composites, and amounts of carbon included in the $SiO_2/C$ composites;

FIG. 5 illustrates an SEM image of a Si/C composite according to Example 3 of the present invention after reduction, a particle diameter of the Si/C composite, and an amount of carbon included in the Si/C composite; and FIG. 6 is a graph illustrating capacity characteristics of coin-type half-cells prepared according to Examples 5 and 6 of the present invention according to the number of cycles.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In a silicon (Si)/carbon (C) composite according to an embodiment of the present invention, carbon is dispersed in an atomic state in a silicon particle.

In a case where only Si is used as an anode active material, deterioration of lifetime may occur due to shrinkage/expansion during charge and discharge, and, in a case where only silicon oxide is used, a lithium battery having high capacity may not be achieved.

The Si/C composite according to the embodiment of the present invention may not only have high charge and discharge capacity and excellent capacity retention ratio, but may also further improve electrical conductivity and minimizing volume expansion by including highly conductive carbon that is dispersed in an atomic state in a Si particle. Thus, life characteristics of the lithium secondary battery may be improved.

The term "composite" used in the present specification denotes a material exhibiting a more effective function while two or more materials are combined to form a physically and chemically different phase.

Specifically, the Si/C composite according to the embodiment of the present invention does not denote a simple aggregate or mixture of Si and C, but denotes a state in which carbon is embedded in the Si particle.

In general, in a case where Si and C are chemically bonded together, a SiC phase may be formed. Since the SiC phase has irreversibility, it may be difficult to be used as an anode material of the secondary battery.

However, according to an embodiment of the present invention, since carbon may be formed by not being chemically bonded with Si, limitations in irreversibility may be addressed. In addition, carbon is not agglomerated in the Si particle, but is uniformly dispersed in an atomic state in the Si particle. Thus, the electrical conductivity may be further improved and the volume expansion may be minimized.

A molar ratio of C to Si (C/Si ratio) in the Si/C composite may be greater than 0 and less than 18.

An amount of carbon included in the Si/C composite according to the present invention may be in a range of 1 wt % to 50 wt % based on a total weight of the Si/C composite, and for example, may be in a range of 1 wt % to 20 wt %. In the case that the amount of carbon is less than 1 wt %, an effect of improving the electrical conductivity of the composite is insignificant, and in the case in which the amount of carbon is greater than 50 wt %, high capacity may not be obtained due to a decrease in the amount of silicon.

Methods of preparing the Si/C composite according to embodiments of the present invention are illustrated in FIGS. 1 and 2, and these methods will be described in detail below.

Referring to FIG. 1, the method of preparing a Si/C composite according to the embodiment of the present invention may include: i) mixing an aromatic group-containing silicon alkoxide compound expressed by Chemical Formula 1 with an organic solvent to form a $SiO_2/C$ composite; ii) mixing the $SiO_2/C$ composite obtained in step i) with an alkali metal or an alkaline earth metal and heat treating the mixture in an inert atmosphere to reduce $SiO_2$; and iii) acid treating the heat-treated product obtained in step ii) to remove an oxide.

  <Chemical Formula 1> where, $R^1$ is a phenyl group, $R^2$ is an alkoxy group of $C_1$ to $C_4$, and n is 1 to 3.

Step i) is a step of forming a $SiO_2/C$ composite, in which an aromatic group-containing silicon alkoxide compound expressed by Chemical Formula 1 is added to an organic solvent, then stirred for 10 minutes to 72 hours, and dried to obtain the $SiO_2/C$ composite. With respect to the stirring, a stirring temperature is not particularly limited, and the stirring may be performed at room temperature in order to sufficiently convert the compound of Chemical Formula 1 into $SiO_2$ and carbon. The stirring may be performed in an ambient atmosphere or an inert atmosphere, such as hydrogen or argon. However, the present invention is not limited thereto.

The organic solvent used in step i), for example, may be alcohol or tetrahydrofuran (THF).

According to an embodiment of the present invention, after the stirring, the product thus obtained is in a state in which $SiO_2/C$ is precipitated in the organic solvent, and a composite, in which carbon is included in $SiO_2$ nanoparticles, may be obtained when the precipitated $SiO_2/C$ is washed and dried.

Also, according to an embodiment of the present invention, a linear silicon alkoxide compound may be further added in step i) to obtain a $SiO_2/C$ composite by a condensation polymerization reaction between the aromatic group-containing silicon alkoxide compound and the linear silicon alkoxide compound.

According to an embodiment of the present invention, a flowchart for preparing a $SiO_2/C$ composite using a linear silicon alkoxide compound is illustrated in FIG. 2.

In the $SiO_2/C$ composites prepared in step i) of FIGS. 1 and 2, C is generated from the aromatic group-containing silicon alkoxide compound, and thus, an amount of carbon in the $SiO_2/C$ composites or Si/C composites may be adjusted according to an amount of the aromatic group-containing silicon alkoxide compound.

As illustrated in FIG. 1, in a case where only the aromatic group-containing silicon alkoxide compound is used in step i), the aromatic group-containing silicon alkoxide compound may be included in an amount of 0.1 parts by weight to 20 parts by weight, for example, 0.5 parts by weight to 10 parts by weight based on the organic solvent. In the case that the amount of the aromatic group-containing silicon alkoxide compound used is greater than 20 parts by weight, the size of composite particles may be non-uniform. In the case in which the amount of the aromatic group-containing silicon alkoxide compound is less than 0.1 parts by weight, a hydrolysis reaction may not proceed and thus, a desired $SiO_2/C$ composite may not be obtained.

Also, in a case where the linear silicon alkoxide compound is added as to the organic solvent in step i) of FIG. 2, a mixing ratio of the aromatic group-containing silicon alkoxide compound to the linear silicon alkoxide compound may be in a range of 1:0.3 to 1:60 as a molar ratio. When the amount of the linear silicon alkoxide compound used is greater than the above mixing ratio, a desired amount of carbon may not be obtained in the Si/C composite, and as a result, limitations in volume expansion may not be improved. Thus, the life characteristics of the battery may degrade.

According to an embodiment of the present invention, the condensation polymerization reaction may be performed in a temperature range of 20° C. to 60° C. for 10 minutes to 72 hours.

The aromatic group-containing silicon alkoxide compound may be any one selected from the group consisting of phenyltriethoxysilane (PTES), phenyltrimethoxysilane (PTMS), and diphenyldiethoxysilane (DDES), or a mixture of two or more thereof, and for example, may be PTES.

According to an embodiment of the present invention, the aromatic group-containing silicon alkoxide compound may include amorphous silicon and amorphous silicon may be generated in the Si/C composite by using the aromatic group-containing silicon alkoxide compound including amorphous silicon. Thus, the volume expansion may be minimized, and as a result, the life characteristics of the secondary battery may be improved. Also, carbon may not be agglomerated in the Si particle, but may be uniformly dispersed in an atomic state in the Si particle.

The linear silicon alkoxide compound according to an embodiment of the present invention may be any one selected from the group consisting of tetraethyl orthosilicate (TEOS), tetramethyl orthosilicate (TMOS), tetrapropyl orthosilicate (TPOS), and tetrabutyl orthosilicate (TBOS), or a mixture of two or more thereof, and for example, may be TEOS or TMOS.

A particle diameter of the $SiO_2/C$ composite prepared in step i) may be in a range of 10 nm to 5 μm.

Step ii) is a step of reducing silica ($SiO_2$), in which the $SiO_2/C$ composite obtained in step i) is mixed with an alkali metal or an alkaline earth metal, and then heat treated in an inert atmosphere to reduce the silica. The reduction, for example, may be performed in an inert atmosphere, such as argon, and the heat treatment may be performed in a temperature range of 350° C. to 1400° C., for example, 500° C. to 1000° C. for 1 minute to 100 hours. In a case where the heat treatment is performed outside the above heat treatment condition, the silica may not be sufficiently reduced or there may be no economic benefit due to excess temperature or time.

According to an embodiment of the present invention, the alkali metal or the alkaline earth metal may be used as a reducing agent. The alkali metal may be lithium, sodium, potassium, rubidium, cesium, or francium, and the alkaline earth metal may be beryllium, magnesium, calcium, strontium, barium, or radium.

Step iii) is a step of removing an oxide of the reducing agent, in which the heat-treated product obtained in step ii) is acid-treated to remove the oxide of the reducing agent and thus, a Si/C composite is obtained. An acid aqueous solution, such as a hydrochloric acid aqueous solution, a sulfuric acid aqueous solution, or a nitric acid aqueous solution, may be used in the acid treatment.

The Si/C composite according to the embodiment of the present invention may include a residual $SiO_2/C$ composite, and a trace of SiC, in which Si—C nano-domains are combined, may also be generated.

A reaction mechanism of the Si/C composite prepared according to the embodiment of the present invention is illustrated in FIG. 3. The reaction mechanism of FIG. 3, for example, is a case of using TEOS as the linear silicon alkoxide compound, wherein the reaction mechanism illustrates that TEOS is mixed with an aromatic group-containing silicon alkoxide compound (In FIG. 3, R may be an alkoxy group of $C_1$ to $C_4$) and condensation-polymerized to form a $SiO_2/C$ composite, and a Si/C composite may be obtained by reducing the $SiO_2/C$ composite.

According to an embodiment of the present invention, the Si/C composite prepared by the above preparation method is included. A schematic diagram of the Si/C composite is illustrated in FIG. 3. Referring to FIG. 3, in the Si/C composite, C having excellent conductivity may be uniformly dispersed in an atomic state in the Si particle without chemical bonding. Therefore, charge and discharge capacity may be high and a capacity retention ratio may be excellent due to the Si particle. Since the carbon having excellent conductivity is dispersed in an atomic state in the Si particle, the electrical conductivity may be further improved and the volume expansion may be minimized. Thus, the life characteristics of the lithium secondary battery may be improved.

A particle diameter of the Si/C composite prepared according to the embodiment of the present invention is in a range of 10 nm to 100 μm, may be in a range of 20 nm to 5 μm, and for example, may be in a range of 50 nm to 1 μm. In the case that the particle diameter of the Si/C composite is less than 10 nm, a side reaction may occur due to a large surface area and there may be difficulties in processing. In the case in which the particle diameter of the Si/C composite is greater than 100 μm, the volume expansion of the battery may occur.

According to an embodiment of the present invention, the Si/C composite as it is may be used in an anode active material. However, since a step of coating a surface of the Si/C composite with carbon by mixing the Si/C composite with a carbon precursor may be further included after step iii), a carbon coating layer may be further comprised on the surface of the Si/C composite particle.

That is, since the Si/C composite may further include carbon by coating the surface of the Si/C composite with carbon in the state in which carbon is embedded in Si, electrical conductivity between silicon particles may be further improved.

The carbon precursor is dispersed in a solvent and the solution thus obtained is mixed with the Si/C composite. Then, the carbon coating layer according to an embodiment of the present invention may be obtained by drying and heat treating the mixture thus obtained.

Any carbon precursor may be used without limitation so long as it may form carbon by a heat treatment, and for example, pitch or a hydrocarbon-based material may be used. Examples of the hydrocarbon-based material may be furfuryl alcohol or a phenol-based resin.

Also, the organic solvent forming the carbon coating layer, for example, may be alcohol or THF. For example, the coating may be performed by sintering in a temperature range of 300° C. to 1400° C.

The Si/C composite as it is may be used as an anode active material. However, the Si/C composite may be mixed with carbon and/or a material alloyable with lithium to be used as an anode active material. As the material alloyable with lithium, one or more selected from the group consisting of Si, SiOx, tin (Sn), $SnO_x$, germanium (Ge), $GeO_x$, lead (Pb), $PbO_x$, silver (Ag), magnesium (Mg), zinc (Zn), $ZnO_x$, gallium (Ga), indium (In), antimony (Sb), and bismuth (Bi) may be used.

Also, the present invention may include an anode including the anode active material.

An anode according to an embodiment of the present invention may be prepared by a typical method known in the art. For example, a binder and a conductive agent, if necessary, as well as a solvent are mixed with an anode active material including the Si/C composite and stirred to prepare a slurry, and a metal current collector is then coated with the slurry and pressed. Thereafter, an anode may be prepared by drying the metal current collector.

According to an embodiment of the present invention, the binder is used for maintaining a molded article by binding anode active material particles, wherein a binder, such as polytetrafluoroethylene (PTFE), polyvinylidene fluoride (PVdF), or a styrene-butadiene rubber (SBR), may be used. The binder may be categorized as a solvent-based binder (i.e., binder using an organic solvent as a solvent) represented as PVdF and a water-based binder (i.e., binder using water as a solvent) which is any one selected from the group consisting of an acrylonitrile-butadiene rubber, a SBR, and an acrylic rubber, or a mixture of two or more thereof. Since the water-based binder, different from the solvent-based binder, may be economical, may be environmentally friendly, may not be harmful to the health of workers, and may have binding effect larger than that of the solvent-based binder, a ratio of the active material for the same volume may be increased. Thus, the capacity of the lithium secondary battery may be increased. A SBR may be used as the water-based binder.

According to an embodiment of the present invention, a thickener may be further included in the anode of the lithium secondary battery for viscosity control. The thickener may be a cellulose-based compound. For example, the thickener may be any one selected from the group consisting of carboxymethyl cellulose (CMC), hydroxy methyl cellulose, hydroxy ethyl cellulose, and hydroxy propyl cellulose, or a mixture of two or more thereof. According to an embodiment of the present invention, the thickener, for example, may be CMC. The anode active material and the binder may be used in the anode by being dispersed with methyl cellulose in water.

According to an embodiment of the present invention, the conductive agent may be any one selected from the group consisting of natural graphite, artificial graphite, carbon black, acetylene black, Ketjen black, channel black, furnace black, lamp black, thermal black, carbon nanotubes, fullerene, carbon fibers, metal fibers, fluorocarbon, aluminum, nickel powder, zinc oxide, potassium titanate, titanium oxide, and a polyphenylene derivative, or a mixture of two or more thereof. The conductive agent, for example, may be carbon black.

Non-limiting examples of an anode current collector according to an embodiment of the present invention may include copper, gold, nickel, or a copper alloy, or a foil prepared by a combination thereof.

Also, the present invention provides a lithium secondary battery including a cathode, an anode, a separator disposed between the cathode and the anode, and an electrolyte having a lithium salt dissolved therein by using the above-described anode.

The lithium secondary battery according to an embodiment of the present invention may include all types of typical lithium secondary batteries, such as a lithium metal secondary battery, a lithium-ion secondary battery, a lithium polymer secondary battery, or a lithium-ion polymer secondary battery.

The lithium secondary battery of the present invention may be prepared according to a typical method known in the art. For example, the lithium secondary battery may be prepared by inserting a porous separator between the cathode and the anode, and introducing an electrolyte having a lithium salt dissolved therein.

A cathode according to an embodiment of the present invention may be prepared according to a typical method known in the art. For example, a binder, a conductive agent, and a dispersant, if necessary, as well as a solvent are mixed with a cathode active material and stirred to prepare a slurry, and a metal current collector is then coated with the slurry and pressed. Thereafter, the cathode may be prepared by drying the metal current collector.

A cathode current collector is coated with a cathode active material and the cathode may then be prepared by drying the coated cathode current collector. In this case, lithium-containing transition metal oxide may be used as the cathode active material. For example, any one selected from the group consisting of $Li_xCoO_2$(0.5<x<1.3), $Li_xNiO_2$ (0.5<x<1.3), $Li_xMnO_2$(0.5<x<1.3), $Li_xMn_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$(0.5<x<1.3, 0<y<1), $Li_xCo_{1-y}O_2$ (0.5<x<1.3, 0≤y<1), $Li_xNi_{1-y}Mn_yO_2$(0.5<x<1.3, 0≤y<1), $Li_x(Ni_aCo_bMn_c)O_4$(0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}Co_zO_4$ (0.5<x<1.3, 0<z<2), $Li_xCoPO_4$(0.5<x<1.3), and $Li_xFePO_4$ (0.5<x<1.3), or a mixture of two or more thereof may be used. The lithium-containing transition metal oxide may be coated with a metal, such as aluminum (Al), or a metal oxide. Also, sulfide, selenide, and halide may be used in addition to the lithium-containing transition metal oxide.

Any metal having high conductivity and no reactivity in a voltage range of the battery may be used as the metal current collector, in which the slurry of the electrode active material may be easily adhered thereto. Non-limiting examples of the cathode current collector may include aluminum, nickel, or a foil prepared by a combination thereof.

An organic solvent, such as N-methylpyrrolidone (NMP), dimethylformamide (DMF), acetone, and dimethylacetamide, or water, may be used as the solvent used for forming the cathode. These solvents may be used alone or in combination of two or more. An amount of the solvent used may be sufficient if the solvent may dissolve and disperse the electrode active material, the binder, and the conductive agent in consideration of a coating thickness of the slurry and manufacturing yield.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the separator is not limited thereto.

A lithium salt, which may be included as an electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte. However, the present invention is not limited thereto.

A shape of the lithium secondary battery of the present invention is not particularly limited, and for example, a cylindrical type using a can, a prismatic type, a pouch type, or a coin type may be used.

The lithium secondary battery of the present invention may be used as power sources of various electronic products. For example, the lithium secondary battery of the present invention may be used in mobile phones, handphones, game consoles, portable televisions, notebook computers, and calculators. However, the present invention is not limited thereto.

Hereinafter, the present invention will be more fully described according to specific embodiments. The present invention may, however, be embodied in many different forms and should not be construed as being limited to the embodiments set forth herein. Rather, these embodiments are provided so that this disclosure will be thorough and complete, and will fully convey the scope of the present invention to those skilled in the art.

EXAMPLES

Preparation Example 1

<Step (i): $SiO_2$/C Composite Preparation>

Phenyltriethoxysilane (PTES) (0.82 g) and tetraethyl orthosilicate (TEOS) (41.81 g) were mixed at a molar ratio of 1:59 in a 3,000 ml flask, and 1,400 g of ethanol was added thereto and mixed together. The mixture thus obtained was stirred at room temperature for 5 minutes in an ambient atmosphere. Then, a mixture of 34% ammonia water and ultra-pure deionized water (DIW) was slowly added dropwise and stirred for 3 hours. Thereafter, the mixture was reacted at room temperature until gelation occurred. A $SiO_2$/C composite having a $C/SiC_2$ ratio of 0.1 was prepared by drying the gelated product thus obtained.

Preparation Example 2

A $SiO_2$/C composite having a $C/SiO_2$ ratio of 0.5 was prepared in the same manner as in Preparation Example 1 except that PTES and TECS were mixed at a molar ratio of 1:11.

Preparation Example 3

A $SiO_2$/C composite having a $C/SiO_2$ ratio of 1 was prepared in the same manner as in Preparation Example 1 except that PTES and TEOS were mixed at a molar ratio of 1:5.

Preparation Example 4

A $SiC_2$/C composite having a $C/SiC_2$ ratio of 2 was prepared in the same manner as in Preparation Example 1 except that PTES and TECS were mixed at a molar ratio of 1:2.

Preparation Example 5

A $SiO_2$/C composite having a $C/SiO_2$ ratio of 3 was prepared in the same manner as in Preparation Example 1 except that PIES and TEOS were mixed at a molar ratio of 1:1.

Preparation Example 6

A $SiO_2$/C composite having a $C/SiO_2$ ratio of 4 was prepared in the same manner as in Preparation Example 1 except that PTES and TEOS were mixed at a molar ratio of 1:0.5.

Preparation Example 7

A $SiO_2$/C composite having a $C/SiO_2$ ratio of 6 was prepared in the same manner as in Preparation Example 1 except that PTES and TEOS were mixed at a molar ratio of 1:0.

Example 1

Preparation of Si/C Composite Having C/Si Ratio of 0.1

<Step (ii)>
0.1 g of the $SiO_2$/C composite prepared in Preparation Example 1 and 0.085 g of magnesium particles were mixed and heat treated at about 650° C. for about 2 hours and 30 minutes in an argon atmosphere to obtain Si/C+MgO.
<Step (iii)>
The Si/C+MgO obtained in step (ii) was stirred in a 0.1 M hydrochloric aqueous solution for 24 hours and the mixed solution thus obtained was then filtered with a filter paper to remove MgO. The filtered product thus obtained was dried in an oven at 80° C. to obtain a Si/C composite having a C/Si ratio of 0.1.

Example 2

Preparation of Si/C Composite Having C/Si Ratio of 1

A Si/C composite having a C/Si ratio of 1 was prepared in the same manner as in Example 1 except that the $SiO_2$/C composite obtained in Preparation Example 3 was used.

Example 3

Preparation of Si/C Composite Having C/Si Ratio of 2

A Si/C composite having a C/Si ratio of 2 was prepared in the same manner as in Example 1 except that the $SiO_2$/C composite obtained in Preparation Example 4 was used.

Examples 4 to 6

Preparation of Anodes and Lithium Secondary Batteries

Preparation of Anodes

Each Si/C composite prepared in Examples 1 to 3 and graphite were mixed at a weight ratio of 14:86 to be used as anode active materials. Each anode active material, acetylene black as a conductive agent, a styrene-butadiene rubber (SBR) as a binder, and carboxymethyl cellulose (CMC) as a thickener were mixed at a weight ratio of 96:1:2:1, and the mixture thus obtained was then mixed with water ($H_2O$) as a solvent to prepare uniform anode active material slurries.

One side of a copper current collector was coated with each anode active material slurry to a thickness of 65 μm, dried, and rolled. Then, each anode was prepared by punching into a predetermined size.

Preparation of Lithium Secondary Batteries (Coin-Type Half-Cells)

Lithium (Li) metal was used as a counter electrode. Polyolefin separators were respectively disposed between each anode and the Li metal. Then, an electrolyte, in which 1M $LiPF_6$ was dissolved in a solvent having ethylene carbonate (EC) and diethyl carbonate (DEC) mixed at a volume ratio of 30:70, was injected thereinto to prepare coin-type half-cells.

Comparative Example 1

A coin-type half-cell was prepared in the same manner as in Example 4 except that Si, which did not include carbon, was used as an anode active material.

Comparative Example 2

A coin-type half-cell was prepared in the same manner as in Example 4 except that Si (KSC1064, Shin-Etsu Chemical Co. Ltd.), in which the surface thereof was coated with carbon, was used as an anode active material.

Experimental Example 1

<Scanning Electron Microscope (SEM) Image>

The composites prepared in Preparation Examples 1 to 7 were respectively identified by SEM images, and the results thereof are presented in FIGS. 4 and 5.

FIG. 4 illustrates SEM images of the $SiO_2$/C composites prepared in Preparation Examples 1 to 7 before reduction, in which SEM images with a magnification of ×50 k and ×20 k were respectively illustrated.

As illustrated in FIG. 4, it may be understood that particle diameters of the composites were increased as the C/$SiO_2$ ratio increased.

Also, FIG. 5 illustrates an SEM image (×50 k) of the Si/C composite prepared in Example 3 after reduction, As illustrated in FIG. 5, when comparing with the SEM image of Example 4 of FIG. 4, i.e., an SEM image before the reduction, it may be identified that the particle diameter of the composite was not changed, the structure of the particle was well maintained even after the reduction, and carbon was still included in the particle through carbon analysis.

Experimental Example 2

<Measurement of Carbon Contents in $SiO_2$/C Composites and Si/C Composite>

Carbon contents of the composites prepared in Preparation Examples 1 to 7 and Example 3 were respectively measured using a carbon/sulfur content analyzer (CS analyzer), and the results thereof are presented in FIGS. 4 and 5.

As illustrated in FIGS. 4 and 5, it may be understood that an amount of carbon included in $SiO_2$ or Si was increased when the amount of PIES used was increased. When the C/Si ratio was 6, the amount of carbon included in $SiO_2$ or Si was 50 wt % or more. Also, when comparing an amount of carbon in the composite of FIG. 5 after the reduction with an amount of carbon in Preparation Example 4 of FIG. 4 before the reduction, it may be understood that the amount of carbon was decreased while impurities were removed during the reduction.

Experimental Example 3

<Electrode Conductivity Measurement>

Electrode conductivities of the anodes prepared in Examples 4 and 6, and Comparative Example 1 were measured using a sheet resistance meter. The results thereof are presented in Table 1 below.

TABLE 1

| Sample | Particle diameter (nm) | Carbon content (wt %) | Electrode conductivity (S/Cm) |
|---|---|---|---|
| Comparative Example 1 | 350 | 0 | 805.6 |
| Example 4 | 350 | 2.2 | 6516.3 |
| Example 6 | 350-450 | 7.2 | 9017.5 |

As illustrated in Table 1, the conductivities of the anodes of Examples 4 and 6 were 8 times to 10 times or more higher than that of the anode of Comparative Example 1 in which carbon was not included.

Also, when comparing Example 4 with Example 6, it may be confirmed that the electrode conductivity was also increased as the amount of carbon in the Si/C composite increased.

Experimental Example 4

<Capacity Measurement According to Charge and Discharge Cycles>

In order to investigate capacities of the coin-type half-cells prepared in Examples 5 and 6 and Comparative Example 2 according to charge and discharge cycles, the coin-type half-cells prepared in Examples 5 and 6 and Comparative Example 2 were charged at 0.5 C to 4.2 V, 1/41C at 23° C. under a constant current/constant voltage (CC/CV) condition and then discharged at a CC of 0.5 C to a voltage of 1.5 V to measure capacities. The charge and discharge were repeated 1 to 50 cycles. The results thereof are presented in FIG. 6, and relative capacities as ratios of $50^{th}$ cycle capacities to $1^{st}$ cycle capacities are presented in Table 2 below.

TABLE 2

| Sample | Capacity (%) (cycle: Q49th/Q1st, 1.0 V) |
|---|---|
| Comparative Example 2 | 90.5 |
| Example 5 | 90.9 |
| Example 6 | 91.6 |

As illustrated in Table 2 and FIG. 5, the capacities of the coin-type half-cells of Examples 5 and 6 of the present invention were lower than that of the coin-type half-cell of Comparative Example 2, in which the anode active material having carbon coated on the surface thereof was used, from the 1$^{st}$ cycle to a 20$^{th}$ cycle. However, after the 20$^{th}$ cycle, the capacity of Comparative Example 2 was significantly decreased as the number of cycles was increased. In contrast, the capacities of Examples 5 and 6 were gradually decreased, and Examples 5 and 6 exhibited excellent capacities after a 45$^{th}$ cycle in comparison to Comparative Example 2.

Also, in a case where Si is used as an anode active material, a factor that mostly affects cycle characteristics was volume expansion. Therefore, according to the results of Table 2 and FIG. 6, it may be indirectly estimated that limitations in volume expansion was improved.

Although Table 2 and FIG. 6 illustrate the results up to the 50$^{th}$ cycle, it may be estimated that Examples 5 and may exhibit better capacity characteristics than Comparative Example 2 as the number of cycles increases, when comparing slopes of Examples 5 and 6 of the present invention with that of Comparative Example 2.

Furthermore, Examples 5 and 6 exhibited the results of the coin-type half-cells. Therefore, better performances may be expected in lager cells.

While this invention has been particularly shown and described with reference to exemplary embodiments thereof, it will be understood by those skilled in the art that various changes in form and details may be made therein without departing from the spirit and scope of the invention as defined by the appended claims.

The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of preparing a Si/C composite, the method comprising:
   i) mixing an aromatic group-containing silicon alkoxide compound expressed by Chemical Formula 1 with an organic solvent to form a SiO$_2$/C composite;
   ii) mixing the SiO$_2$/C composite obtained in step i) with an alkali metal or an alkaline earth metal and heat treating the mixture in an inert atmosphere to reduce SiO$_2$; and
   iii) acid treating the heat-treated product obtained in step ii) to remove an oxide, $$SiR^1{}_nR^2{}_{4-n} \qquad \text{<Chemical Formula 1>}$$

wherein
   $R^1$ is a phenyl group,
   $R^2$ is an alkoxy group of $C_1$ to $C_4$, and
   n is 1 to 3,
   wherein carbon in the SiO$_2$/C composite is generated from the aromatic group-containing silicon alkoxide compound, and
   wherein an amount of the carbon in the SiO$_2$/C composite is adjusted according to an amount of the aromatic group-containing silicon alkoxide compound.

2. The method of claim 1, wherein the aromatic group-containing silicon alkoxide compound is any one selected from phenyltriethoxysilane (PTES), phenyltrimethoxysilane (PTMS), diphenyldiethoxysilane (DDES), or a mixture of two or more thereof.

3. The method of claim 2, wherein the aromatic group-containing silicon alkoxide compound is PTES.

4. The method of claim 1, wherein an amount of the aromatic group-containing silicon alkoxide compound is in a range of 0.1 parts by weight to 20 parts by weight based on the organic solvent.

5. The method of claim 1, further comprising adding a linear silicon alkoxide compound to the organic solvent in step i).

6. The method of claim 5, wherein the linear silicon alkoxide compound is any one selected from tetraethyl orthosilicate (TEOS), tetramethyl orthosilicate (TMOS), tetrapropyl orthosilicate (TPOS), tetrabutyl orthosilicate (TBOS), or a mixture of two or more thereof.

7. The method of claim 6, wherein the linear silicon alkoxide compound is TEOS or TMOS.

8. The method of claim 5, wherein a mixing ratio of the aromatic group-containing silicon alkoxide compound to the linear silicon alkoxide compound is in a range of 1:0.3 to 1:60 as a molar ratio.

9. The method of claim 1, wherein the alkali metal is lithium, sodium, potassium, rubidium, cesium, or francium.

10. The method of claim 1, wherein the alkaline earth metal is beryllium, magnesium, calcium, strontium, barium, or radium.

11. The method of claim 1, wherein the heat treatment of step ii) is performed in a temperature range of 350° C. to 1400° C.

12. The method of claim 1, further comprising coating a surface of the Si/C composite with carbon by mixing the Si/C composite with a carbon precursor after step iii).

13. The method of claim 12, wherein the coating is performed in a temperature range of 300° C. to 1400° C.

14. The method of claim 12, wherein the carbon precursor is pitch or a hydrocarbon-based material.

* * * * *